United States Patent [19] [11] 3,886,386
Hillig [45] May 27, 1975

[54] CARBON FIBER CURRENT COLLECTION BRUSH

[75] Inventor: William B. Hillig, Ballston Lake, N.Y.

[73] Assignee: General Electric Company, Schenectady, N.Y.

[22] Filed: Aug. 1, 1973

[21] Appl. No.: 384,590

[52] U.S. Cl. .............................................. 310/251
[51] Int. Cl. .......................................... H02k 13/00
[58] Field of Search ........... 310/248, 219, 249, 229, 310/250, 230, 251, 252, 253; 313/331, 332, 336

[56] References Cited
UNITED STATES PATENTS

| | | | |
|---|---|---|---|
| 1,878,323 | 9/1932 | Quist | 310/248 |
| 2,019,065 | 10/1935 | Apple | 310/249 |
| 2,716,684 | 8/1955 | Barnes | 29/630 E |
| 2,783,405 | 2/1957 | Atkins | 310/253 |
| 3,254,189 | 5/1966 | Evanicsko | 29/630 E |
| 3,382,387 | 5/1968 | Marshall | 310/251 |
| 3,509,400 | 4/1970 | Conrath | 310/248 |
| 3,525,006 | 8/1970 | Parr | 310/252 |
| 3,668,451 | 6/1972 | McNab | 310/251 |

*Primary Examiner*—R. Skudy
*Attorney, Agent, or Firm*—William A. Teoli; Joseph T. Cohen; Jerome C. Squillaro

[57] ABSTRACT

A carbon fiber current collection brush comprises a carbon body having a plurality of spaced apertures therethrough, a plurality of elongated carbon fibers positioned in each of the apertures and extending outwardly therefrom in both opposite directions, a flexible metallic sheath covering the portion of the fibers within each of the apertures and the portion of the fibers extending outwardly in one direction, and the fibers extending outwardly in the other direction being exposed and being generally of uniform length from the edge of the carbon body. A method is described for making such a brush.

2 Claims, 3 Drawing Figures

CARBON FIBER CURRENT COLLECTION BRUSH

This invention relates to current collection brushes and to methods of making such brushes and, more particularly, to carbon fiber current collection brushes and to methods of making such brushes.

Carbon current collection brushes are employed in rotating brush-type machines which brushes are generally fabricated of carbon, a relatively poor electrical conductor, reinforced by other materials and graphitized. Graphite is also employed for such brushes. For example, carbon is mixed with a pitch binder and the mixture is graphitized. These brushes are referred therein as carbon current collection brushes or merely as carbon brushes. Such carbon brushes are retained in position by brush holders which generally are in the form of square or rectangular sleeves serving as a guide for any radical motion of the brush resulting from vibration or eccentricity of the armature. The brush holder may be mounted on a bracket to maintain a rigid position spaced from the commutator surface. An adjustable spring connected to the bracket bears on the top surface of the brush to maintain a desired contact pressure of the bottom surface of the brush upon the commutator segments or slip ring. With such carbon current collection brushes or carbon brushes, as these brushes are generally referred to, the wear rate in electric motors, for example, increases rapidly with increasing current density.

Carbon fiber brushes have been described, for example, in "Electronics and Power" pages 8–10, Jan. 1972 which journal is published by the Institution of Electrical Engineers, London, England. This article describes carbon fiber brushes for super-conducting machines. Metal plated carbon fibers are held in a brush holder which has leads extending from the opposite surface. FIG. 3 on page 10 shows such a brush. Stated early work is set forth on page 9, column 2, lines 32–34 wherein plain carbon or graphite fibers were employed in the brushes. The results of this early work are set forth on page 9, column 3, lines 1–21 which concluded in 19–21 that "... made the use of such brushes for homopolar generators singularly unattractive."

The present invention is directed to an improved current collection brush with a carbon body and with pluralities of carbon fibers extending therefrom adapted to be in contact with or to ride on the surface of a commutator or slip ring.

The primary objects of our invention are to provide an improved current collection brush which brush will produce a great plurality of electrical contact points with an associated commutator and will have good electrical conduction from these points to an associated electrical lead.

In accordance with one aspect of our invention, a carbon fiber current collection brush includes spaced apart pluralities of elongated fibers extending from apertures in a carbon body and the remainder of each plurality of fibers covered by a flexible metal sheath.

The above objects and other objects, features and advantages of the invention will be better understood from the following description taken in connection with the accompanying drawing in which.

Figure 1:
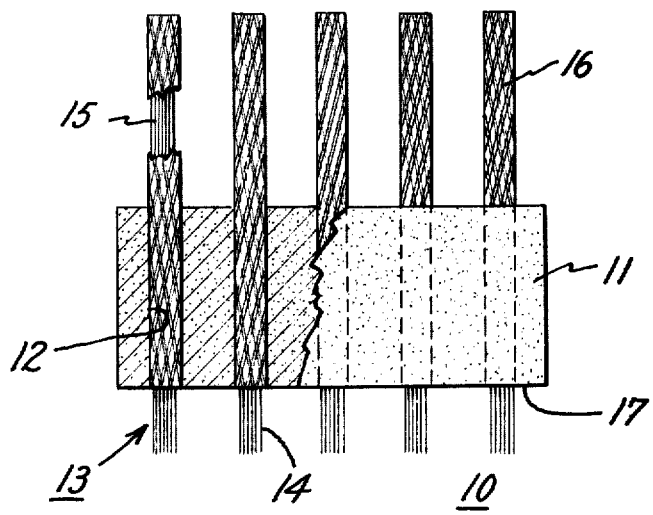
FIG. 1 is a partial sectional view through a carbon fiber current collection brush made in accordance with our invention.

In FIG. 1 of the drawing, there is shown a partial sectional view of a carbon fiber current collection brush 10 made in accordance with our invention. Brush 10 comprises a carbon body 11 having a plurality of spaced apertures 12 therethrough. A plurality of elongated carbon fibers 13 are positioned in each of the apertures and extend outwardly therefrom in both opposite directions as shown at 14 and 15. A flexible metallic sheath or cover 16 covers the portion of fibers 13 within each aperture 12 and the portion of the fibers extending outwardly in one direction as shown at 15. The portion of fibers 13, which extend outwardly at 14 are exposed and not covered and are generally at uniform length from edge 17 of carbon body 11. Carbon fibers 13 of each portion 14 are adapted to contact or ride on the surface of a commutator or a slip ring. The sheaths 16 covering portions 15 of fibers 13 are adapted for formation into an electrical lead.

Figure 2:
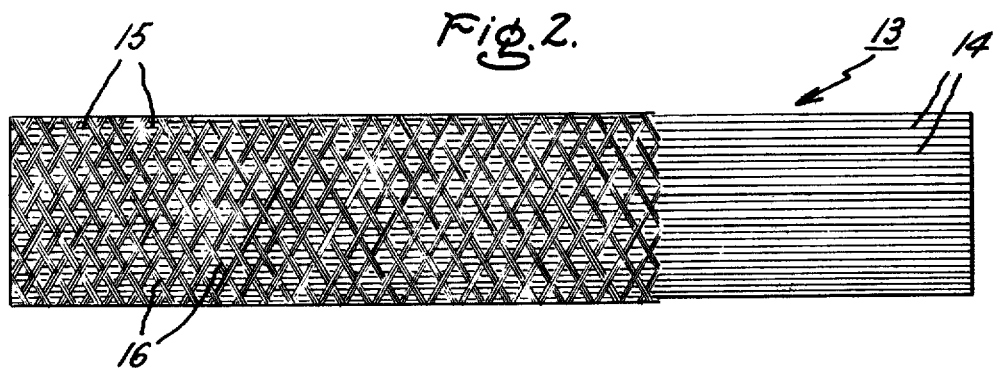
FIG. 2 is a side elevational view of a plurality of carbon fibers within a flexible metallic sheath prior to being placed in tension.

In FIG. 2 of the drawing, there is shown a side elevational view of a plurality of fibers 13 within a flexible metallic sheath 16 prior to being placed in tension. Fibers 13 extend from one end of sheath 16 at 14. Portion 15 of fibers 13 are shown within sheath 16.

Figure 3:
FIG. 3 is a side elevational view of a plurality of carbon fibers within a flexible metallic sheath after the fibers and sheath have been placed in tension.

In FIG. 3 of the drawing, there is shown a side elevational view of a plurality of fibers 13 compressed radially within expanded metallic sheath 16. A portion 14 of fibers 13 extend outwardly from sheath 16, in which the fibers of portions 14 are exposed and not covered and are generally of uniform length.

We found that we could make a carbon fiber collection brush by providing a carbon body, for example, a block of bulk graphite of the size and shape which is currently used for brushes in large rotating electrical equipment. A plurality of spaced apertures are formed through the carbon body. While a preferred configuration is a plurality of uniformly spaced apertures, each of which is of identical diameter, other spacing or varying size apertures can be employed depending upon the particular type of brush application.

We found that we could have a plurality of exposed or uncoated carbon fibers extending from each of the apertures to form a fiber brush which is adapted to contact or ride on the surface of a commutator or a slip ring thereby providing a great plurality of electrical contact points. We found further that we could make good electrical contact with the exposed fibers to provide a suitable electrical lead. We accomplished both desirable features by positioning a flexible metallic sheath over a portion of each plurality of fibers and exposing or not covering a portion of each plurality of fibers. We position each sheath covered portion within a carbon body aperture and extend the sheath outwardly therefrom. We position each sheath so that the exposed fibers extend or protrude from each aperture in the opposite direction from the carbon body. The fiber sheaths can be joined together in the form of an electrical lead or attached to such a lead.

We find that our carbon fiber pluralities with an exposed portion for a brush and with a metallic sheathed portion for direct electrical conduction provides the shortest electrical path.

As opposed to our invention, the above referenced "Electronics and Power" brush has a large bundle of fibers held together with a brush holder portion and has an electrical connection to the brush holder. In this manner a long electrical path is required with attendant problems of increased electrical resistance.

"Carbon fibers" which are described in the application and recited in the claims employ elongated carbon fibers or filaments, graphite fibers or filaments, or a mixture of both. Such carbon fibers are available, for example, in the form of tows in which each tow has numerous elongated carbon fibers. For example, tows of 10,000 elongated carbon filaments are commercially available under the name of Magnamite, further described as types HM-S, HT-S, A, among others, which are produced by Hercules, Inc., Wilmington, Del. Additionally, such elongated carbon filaments are available in tows containing approximately 1,000 elongated carbon filaments under the name of WYK braids which are available commercially from Union Carbide, New York, N.Y. Such carbon fibers can also be plated with an electrical conductive metal such as copper, nickel, etc. Such plating can be electroless copper plating as described in U.S. Pat. No. 3,649,350. Further patents describing such plating are listed in column 2, lines 37-47 of U.S. Pat. No. 3,649,350.

As it is best shown in FIGS. 2 and 3 of the drawing, a plurality of carbon fibers 13 in the form of a number of carbon fiber tows are positioned within a flexible porous metallic sheath 16 and extend from one end of sheath 16 at 14. I prefer a flexible porous metallic sheath such as copper braid. Such flexible porous metallic sheath can be a braided, knitted or wire metallic fabric. Additionally, flexible metallic tubing can be employed in the same manner as the flexible porous metallic sheath. However, the tubing is not as advantageous to form or secure the fibers therein. When flexible porous metallic sheaths 16 as shown in FIG. 2 are employed, each sheath can be pulled through an aperture 12 in body 11 thereby positioning sheath 16 and applying force to sheath 16 to align and pack densely fibers 13 therein.

In FIG. 3, the plurality of fibers 13 are shown as held securely together and densely packed by sheath 16. A portion 14 of fibers are exposed and not covered by the sheath. Carbon fibers 13 with sheath 16 covering a substantial portion thereof as shown in FIG. 3 are employed in the carbon fiber current collection brush of FIG. 1. The sheath 16 as shown in FIG. 2 can also have tensile force applied to sheath 16 along the longitudinal direction of fibers 13 thereby aligning and packing densely fibers 13 therein resulting in the structure shown in FIG. 3 which can be inserted in apertures 12 of body 11 in FIG. 1.

Examples of a carbon fiber current collection brush made in accordance with the method of my invention are set forth below:

EXAMPLE I

Two carbon fiber current collection brushes were formed as described above and as shown in the FIG. 1-3 of the drawing. Ten carbon fiber tows were positioned in each of eight flexible copper braids. Each of these tows contained 10,000 elongated Magnamite carbon fibers as described above. The copper braid was approximately 2.25 inches long while the tows were approximately two inches long extending from one end of the braid.

A block of graphite 1 × 1 × 0.5 inch had 8 apertures drilled therethrough to uniformly space apart the apertures. Two blocks were prepared. Each aperture had a diameter of 0.154 inch. Each sheathed plurality of fibers was pulled through each aperture in both blocks whereby each sheath was compressed radially, positioned within and extending from each aperture in one direction. The exposed or uncovered fibers were positioned outside the aperture and extended outwardly in the opposite direction from the graphite block. The resulting two structures were carbon fiber current collection brushes made in accordance with my invention.

EXAMPLE II

Two carbon fiber current collection brushes were formed as described above and as shown in the FIG. 1-3 of the drawing. Ten carbon fiber tows were positioned in each of eight flexible copper braids. Each of these tows contained 10,000 elongated Magnamite carbon fibers as described above. Prior to being positioned within the sheaths, the carbon fibers were electroless copper plated as above described in the application. The copper braid was approximately 2 ¼ inches long while the tows were approximately 2 inches long extending from one end of the braid.

A block of graphite 1 × 1 × 0.5 inch had 8 apertures drilled therethrough to uniformly space apart the apertures. Two blocks were prepared. Each aperture had a diameter of 0.154 inch. Each sheathed plurality of fibers was pulled through each aperture in both blocks whereby each sheath was compressed radially, positioned within and extending from each aperture in one direction. The exposed or uncovered fibers were positioned outside the aperture and extended outwardly in the opposite direction from the graphite block. The resulting two structures were carbon fiber current collection brushes made in accordance with my invention.

EXAMPLE III

Two carbon fiber current collection segments were formed to demonstrate that a plurality of carbon fibers would function for current collection, that a metallic sheathed portion would satisfactorily conduct current from the exposed fibers and that the sheathed portion would be positioned in and maintained in a graphite block aperture.

Each of two pluralities of carbon fibers were assembled within a sheathed portion as described above in Example I. Two small portions or segments of a graphite block were made, and an aperture was provided through each segment. Each carbon fiber current collector segment was then assembled as described above in Example I wherein an exposed portion of carbon fibers extended from one edge of the graphite block segment and a sheathed portion extended from the opposite edge.

EXAMPLE IV

Brush wear of each of the carbon fiber current collector segments made in Example III were determined at current densities of 25, 75 and 125 amps/sq. in. Brush wear of two standard carbon brushes were also determined under similar conditions. One brush was employed as the positive brush and one brush was employed as the negative brush which was tested in air.

The brushes are identified as standard brush and as Example II brush. The results are shown below in Table I.

TABLE I

| | POSITIVE BRUSH BRUSH WEAR RATE - cm/day | | |
|---|---|---|---|
| Brush | At 25 amps/ sq. in | At 75 amps/ sq. in. | At 125 amps/ sq. in. |
| Standard | 0.0017 | 0.0124 | 0.0131 |
| Ex. II | 0.0019 | 0.0122 | 0.0124 |
| | NEGATIVE BRUSH BRUSH WEAR RATE - cm/day | | |
| Brush | At 25 amps/ sq. in. | At 75 amps/ sq. in. | At 125 amps/ sq. in. |
| Standard | 0.0013 | 0.00168 | 0.0019 |
| Ex. II | 0.0016 | 0.00175 | 0.0108 |

The voltage drop was measured for each set of brushes, standard and Example II brushes, at current densities of 25, 75 and 125 amps/sq. in. These results are set forth in Table II. Each voltage drop represents the voltage across the whole of the current collector assembly.

TABLE II

| | VOLTAGE DROP AS A FUNCTION OF CURRENT DENSITY VOLTAGE DROP - VOLTS | | |
|---|---|---|---|
| Brush | At 25 amps/ sq. in. | At 75 amps/ sq. in. | At 125 amps/ sq. in. |
| Standard | 3.7 | 5.9 | 7.3 |
| Ex. II | 7.3 | 10.0 | 10.5 |

While other modifications of the invention and variations thereof which may be employed within the scope of the invention have not been described, the invention is intended to include such as may be embraced within the following claims:

What I claim as new and desire to secure by Letters Patent of the United States is:

1. A carbon fiber current collection brush comprising a carbon body having a plurality of spaced apertures therethrough, a plurality of elongated carbon fibers positioned in each of the apertures and extending outwardly therefrom in both opposite directions, a flexible braided metallic sheath covering the portion of the fibers within each of the apertures and the portion of the fibers extending outwardly in one direction, and the fibers extending outwardly in the other direction being exposed and being generally of uniform length from the edge of the carbon body.

2. A carbon fiber current collection brush as in claim 1, in which the apertures are uniformly spaced and are of uniform diameter.

* * * * *